Sept. 29, 1942.    R. H. HOUCK ET AL    2,297,149
GLASS CUTTING MACHINE
Filed July 2, 1938    4 Sheets-Sheet 1

INVENTORS
Robert H. Houck
Joseph F. Greene
Oswald Behrend
BY Charles B. Belknap
ATTORNEY.

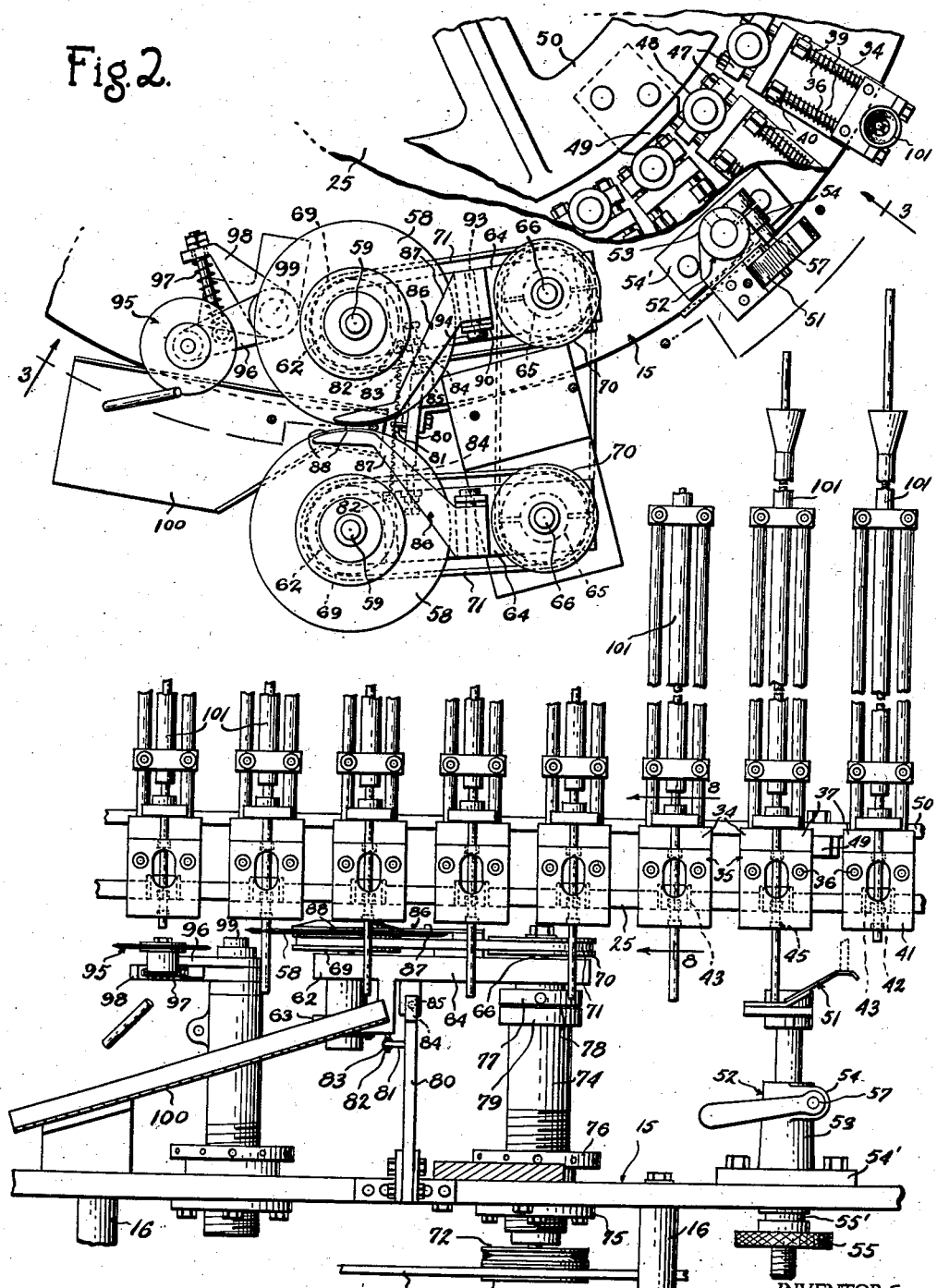

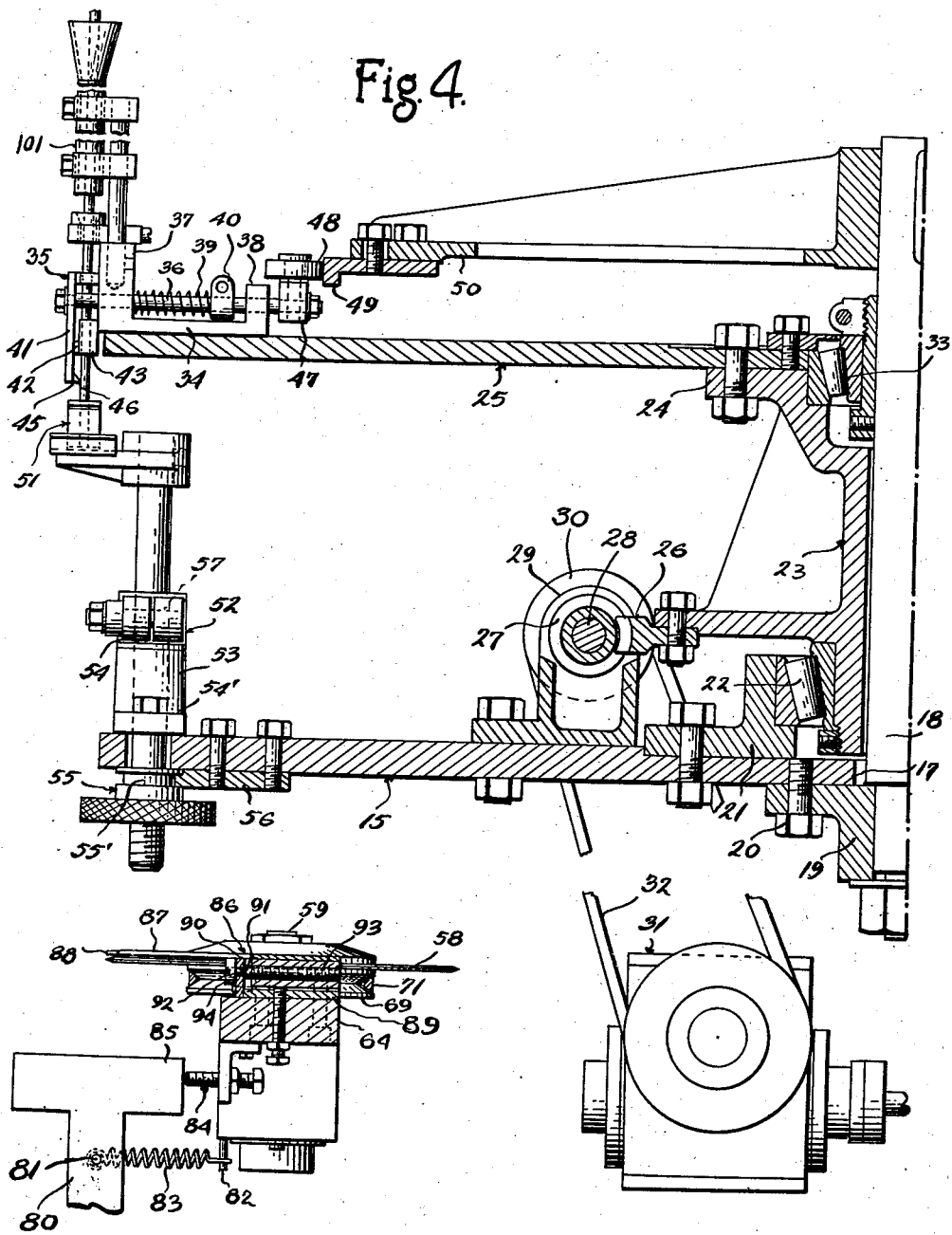

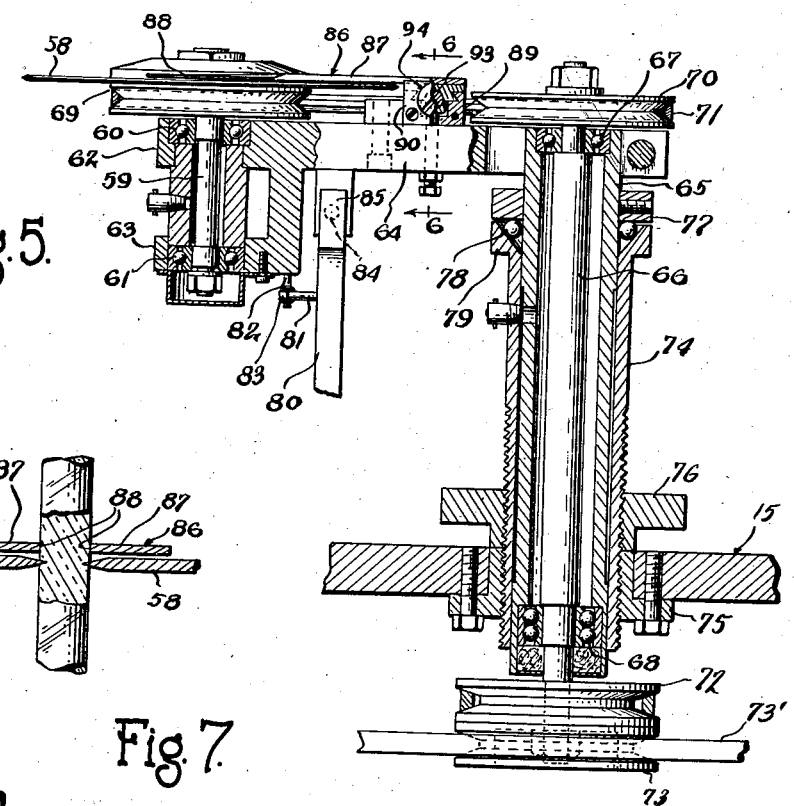
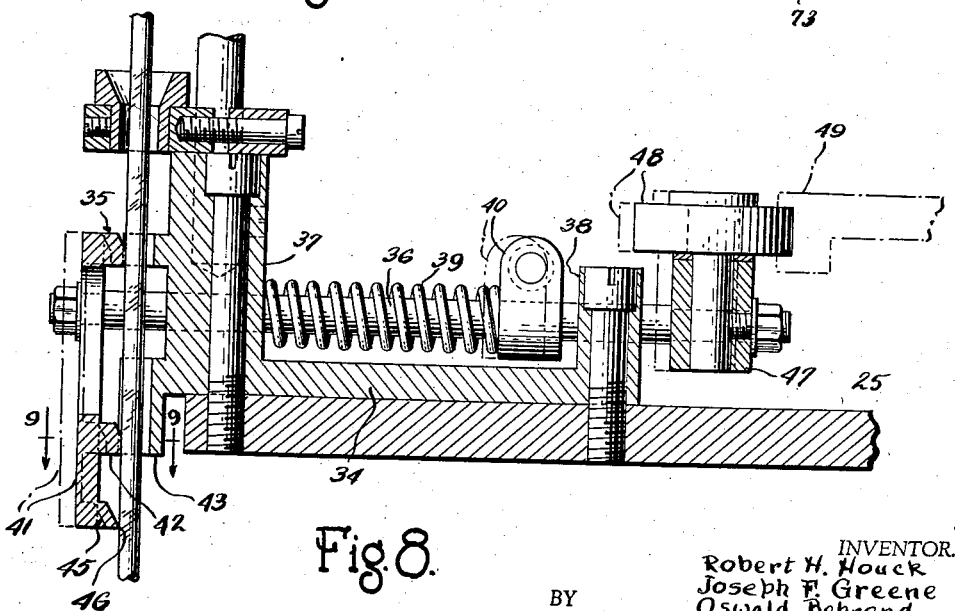

Patented Sept. 29, 1942

2,297,149

UNITED STATES PATENT OFFICE 2,297,149

GLASS CUTTING MACHINE

Robert H. Houck, Joseph F. Greene, and Oswald Behrend, Vineland, N. J., assignors to Kimble Glass Company, Vineland, N. J., a corporation of Illinois Application July 2, 1938, Serial No. 217,272

7 Claims. (Cl. 49—48)

This invention relates to a machine for cutting predetermined lengths of glass tubes and rods from relatively long stock, and more particularly to a continuously operated, multiple-feed machine. It is common practice in the art of manufacturing glass tubing and rods to cut relatively long lengths of stock from the formed glass in a continuous drawing apparatus. These long lengths of stock are in turn cut into much shorter lengths. Where the cutting is done by hand, the operations are slow and laborious. In the present machine, a plurality of lengths of stock are positioned in the machine by the operator, after which subsequent automatic operations then gauge, score, and break off short lengths of desired and accurate dimensions.

One of the objects of the present invention is to provide a continuously movable table, preferably a table rotatable about a vertical axis, to which is supplied a plurality of lengths of tube or rod stock positioned thereon by spaced guides, together with intermittently actuated means for releasing and gauging predetermined short lengths of stock and means for dividing the stock into these short lengths.

Another object of the invention is so to score the stock prior to dividing it into short lengths that the ends of the short lengths will be free from sharp edges.

Still another object of the invention is the provision of means to control the depth of the score made in the stock.

Other objects will be apparent from the following description of the invention taken in connection with the accompanying drawings, in which:

Fig. 2 is a fragmentary enlarged top plan view of the scoring mechanism and a part of the feed table;

Fig. 3 is a fragmentary side elevation, partly in section, of the mechanism shown in Fig. 2;

Fig. 4 is a section taken on line 4—4 of Fig. 1;

Fig. 5 is a partial sectional elevation of the scoring mechanism illustrated in Fig. 2;

Fig. 6 is a section taken on line 6—6 of Fig. 5;

Fig. 7 is a fragmentary view of the scoring knives showing the manner in which they act on a glass rod;

Fig. 8 is a section taken on line 8—8 of Fig. 3;

Figures 1, 9, 10:
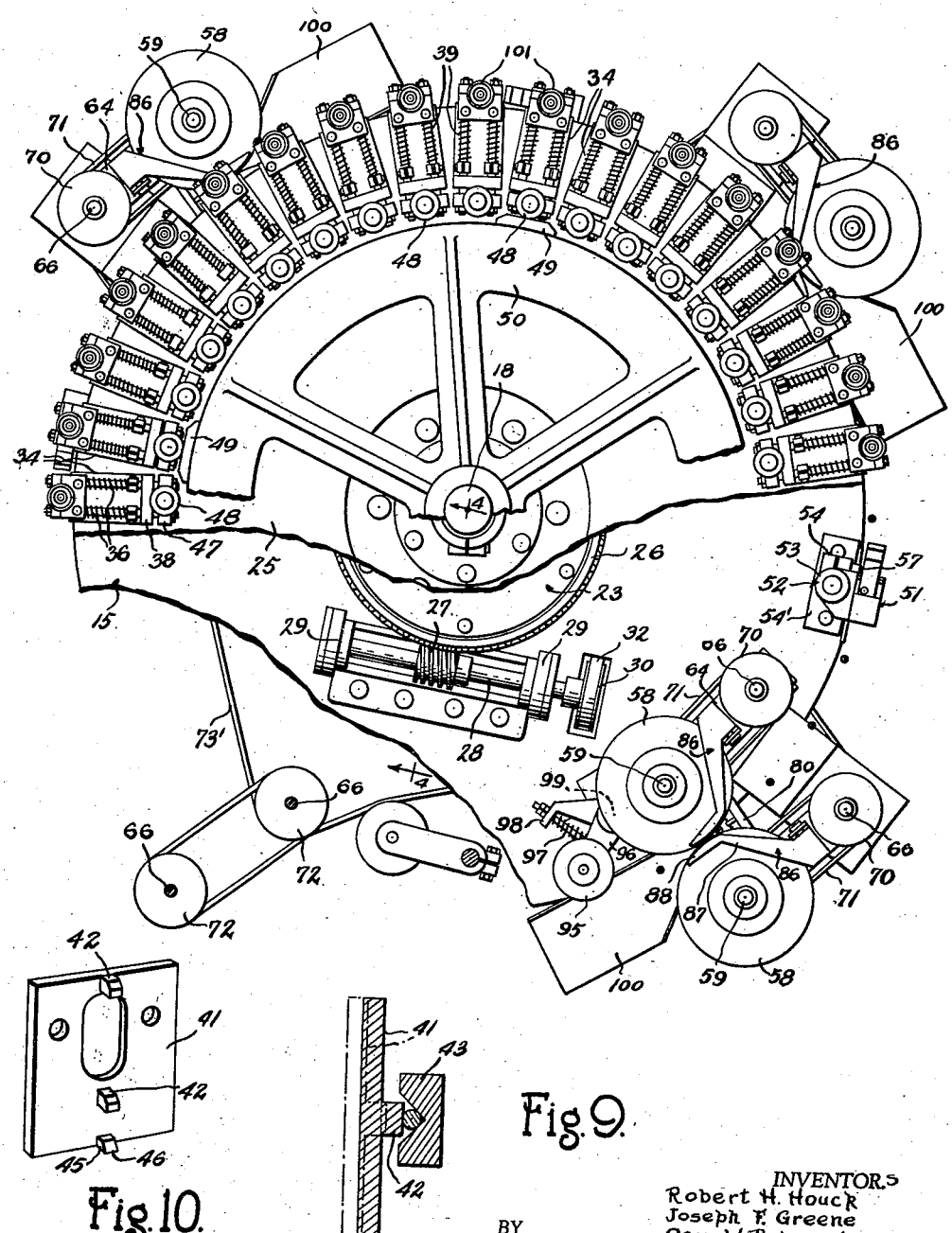
Fig. 1 is a fragmentary top plan view of a preferred form of the invention.
Fig. 9 is a section taken on line 9—9 of Fig. 8.
Fig. 10 is a perspective view of one of the clamping plates employed in the machine.

Referring to the drawings, it will be seen that a circular stationary table 15 is suitably supported on legs 16. Table 15 is apertured at 17 to receive one end of a stationary vertical shaft 18, the latter resting in bearing 19 secured to the under side of the table by bolts 20. Fastened to the upper side of the table is a bearing ring 21 which accommodates roller thrust bearing 22. Collar 23 is supported by bearing 22 and is provided at its upper end with an annular flange 24 to which is secured a circular plate 25. Collar 23 is also provided with an intermediate flange having bolted thereto a worm gear 26 meshing with worm 27. This worm is fast on shaft 28 suitably mounted in bearings 29 and having at one end thereof a pulley 30 adapted to be driven by a motor (not shown) through reduction mechanism 31 and belt 32. Collar 23 is further supported at its upper end by a bearing 33 and, as will be obvious from the drawings, is rotatable about shaft 18, being driven by worm 27.

Secured to the upper face of plate 25 is a plurality of brackets 34 symmetrically spaced around the plate adjacent its periphery and designed to support clamping devices or chucks 35. Each clamp comprises a pair of parallel rods 36 slidably mounted in uprights 37, 38 on the bracket, these rods being normally urged radially inwardly by springs 39 surrounding the rods and having their ends bearing respectively against uprights 37 and collars 40 secured to the rods. Bridging the outer ends of the rods on each clamp is a plate 41 having lateral lugs 42 on its inner face. Each upright 37 has secured thereto or formed thereon an outwardly projecting lug 43 having a V-notch therein. It will be seen that, when springs 39 urge the rods inwardly, the tube or rod stock will be clamped between lugs 42 and 43 and accurately positioned by the V-notch. Incidentally, the stock is so clamped that rotation thereof in the chuck is inhibited. It is also to be noted that each clamp plate 41 has a lateral portion 45 having a beveled edge 46, the purpose of which will be explained hereinafter.

The inner ends of rods 36 are connected by a bridge piece 47 secured to the rods and forming a journal for roller 48. This roller engages cams 49 fixed to spider 50, the latter being fast on shaft 18 and, consequently, stationary. Cams 49 are positioned at spaced intervals on the spider and are designed to move rods 36 and clamp plate 41 radially outward to release the stock and permit it to drop by gravity until the lower end of the stock rests on gauge plate 51. There are as many of these gauge plates as there are cams, each gauge plate being secured to a standard 52 and aligned radially with a cam. Standards 52 are each mounted on stationary table 15, a vertical sleeve 53 having a split upper end 54 and bolting-on flanges 54' for securing the sleeve to the table serving to support the standard in upright position.

The lower end of each standard is threaded to accommodate nut 55, this nut having an annular groove 55' with which plate 56, bolted on the under side of the table, cooperates to hold the nut in fixed relation to the table. Nut 55 is provided with an enlarged knurled flange to permit rotation thereof when it is desired to raise or elevate the gauge plate. The standard is then locked by a locking bolt 57 passing through one side of sleeve 53 and threaded into the other side thereof.

It will be seen by referring to Fig. 3, that each gauge plate is made up of upper and lower horizontal portions between which is an inclined portion. The plate is made of spring steel, the upper horizontal portion being free to yield as the released stock falls thereon and absorb the shock of the drop. As the rotatable plate supporting the stock carries the stock further in its circular path, the end of the stock rides down the inclined portion of the gauge plate until it rests on the lower horizontal portion thereof. While the stock is riding on the gauge plate the chucks aligned with the gauges are open but as the stock moves along the lower horizontal portion of the gauge plate the chucks close and clamp the stock.

After the stock passes the lower portion of the gauge plate, it moves past one of the scoring stations. Scoring of the stock at each station is effected by a pair of opposed disc saws 58 between which the stock passes, so that it is scored at substantially diametrically opposite points as shown in Fig. 7. Each saw is secured to a shaft 59, shown in Fig. 5, this shaft being journaled in bearings 60, 61, in spaced arms 62, 63 on bracket 64. The bracket is fixed to a sleeve 65 surrounding shaft 66 and supporting at its upper and lower ends bearings 67, 68 for shaft 66.

Secured respectively to shafts 59 and 66 are pulleys 69, 70, over which belt 71 passes. At the lower end of shaft 66 is a second pulley 72 adapted to be driven by a suitable motor (not shown). It will be seen that pulley 73 abuts pulley 72 and is intended to drive the lower pulley of the opposite saw. Surrounding sleeve 65 is an outer sleeve 74 having a threaded end cooperating with a similarly threaded flanged bushing 75 bolted to the stationary table 15. Sleeve 74 may be adjusted vertically to regulate the height of the saw, its adjusted position being fixed by lock nut 76. It is to be noted that sleeve 65 is rotatable with respect to sleeve 74 and is supported therein by collar 77 held thereon by a set screw and resting on ball bearing 78 in flange 79 of the sleeve 74. Also fixed to table 15 is a post 80 having a pin 81 thereon. Pin 82 on each of the saw supporting brackets accommodates the end of a tension spring 83, the other end of which is connected to the pin 81 whereby the brackets are normally urged toward each other. An adjustable stop member 84 on each bracket cooperating with a fixed abutment 85 on post 80 (see Fig. 6) limits the movement of the saws toward each other and maintains a fixed spaced relation between their peripheries.

It is desirable that the scoring saws cut into the stock only to a predetermined depth, that is, only sufficiently to facilitate breaking off a short length by lateral pressure. In order to regulate the depth of the scoring cut, there is provided on each saw a guard member 86 having finger 87 thereon. The finger is provided with an arcuate edge 88 which is spaced slightly inwardly from and substantially parallel to the periphery of the saw. The guard is slidably mounted in guide 89 on the bracket and is adjustable therein to regulate the spaced relation of edge 88 and the periphery of the saw. The means for effecting this adjustment comprise a plate 90 on the bracket having an opening 91 which accommodates a reduced end 92 of an adjusting piece 93 threaded into the guard. A head 94 is fixed to the reduced end 92 so that relative axial movement of the adjusting piece with respect to plate 90 is prevented. By turning head 94 the guard is moved to regulate the space between the guard finger and the periphery of the saw.

After the stock has been scored, it engages a break-off disc 95 positioned in the path of the stock. This disc is journaled on arm 96 yieldably urged radially outwardly by spring 97 the ends of which abut respectively arm 96 and fixed member 98 adjustably secured to shaft 99, the latter being stationary and secured to table 15, so that the periphery or stock engaging edge of the disc may be positioned accurately to exert a lateral pressure as the stock engages the arm. At the same time the disc is rotatable to reduce friction as the stock moves thereover. Since the machine is capable of cutting tubes and rods of different diameters, it is apparent that the adjustability of the saws and break-off disc is desirable. Disposed below each break-off disc is a chute 100 into which the broken off short lengths drop and which delivers these lengths to a suitable receptacle.

From the foregoing description the operation of the machine will be obvious. Relatively long lengths of tube or rod stock are fed to the saws through a plurality of circumferentially spaced feeder tubes 101. There is a chuck aligned with each of these feeder tubes. When the chucks open, the stock drops on to one of the gauge plates which determines the distance between the lower end of the stock and the saw and, hence, the length of short tube divided from the long stock. After being thus positioned by the gauge plate and gripped by the chucks, the stock continues its movement in a circular path and comes into engagement with the saws. After being scored at diametrically opposite points, the glass stock then moves into engagement with a break-off disc which imparts a radially outward lateral movement to the lower end of the stock. The bracing edge 46 disposed slightly above the score cut aids in effecting a clean fracture when the break-off arm presses against the stock.

Reference has been made throughout the foregoing description to a plurality of scoring stations and corresponding break-off arms. In the present machine, there are four of each of these devices circumferentially spaced around the table, that is, at every ninety degrees the stock is scored, broken off, and released to fall on a gauge plate. It is obvious, however, that more or fewer stations may be used without departing from the invention.

What is claimed is:

1. In a rod cutting machine, a carrier table rotatable about a vertical axis, means for continuously rotating said table, a plurality of rod guides for positioning rods vertically on said table, a plurality of clamps on said table adapted to hold said rods in predetermined relation to the table, a rotatable scoring saw positioned in the path of said rods, means for rotating said saw, means for breaking said rods after engagement thereof with said saw, means for releasing said clamps after the rods are broken whereby the rods will be lowered by gravity, yieldable guide means for limiting the lowest position of the rods after release thereof, and means for closing the clamps after the rods have been guided to said lowest position.

2. In a rod cutting machine, a rotatable carrier table, means for continuously rotating said table, a plurality of rod guides on said table, a plurality of clamps on said table for holding rods in predetermined relation to said table, a pair of swingable brackets, a rotatable saw journaled on each bracket, said saws being so positioned in the path of said rods as to score opposite sides of each of the rods, means for simultaneously rotating said saws, means for urging said brackets toward each other, adjustable means for limiting the relative positions of the brackets with respect to each other, means for breaking the rods after engagement thereof with said saws, and means for releasing said clamps after the rods are broken.

3. In a rod cutting machine, a rotatable carrier table, means for continuously rotating said table, a plurality of rod guides on said table, a plurality of clamps on said table for holding rods in predetermined relation to said table, a rotatable scoring saw positioned in the path of said rods, means for rotating said saw, a swingable arm on said table adjacent said saw, a rotatable disc journaled on said arm and adapted to engage each rod after the rod is scored to break the rod, yieldable means normally urging said arm and disc toward the path of said rods, and means for limiting the swinging movement of said arm.

4. In a rod cutting machine, a carrier table, a plurality of rod guides on said table, a plurality of plates for clamping rods on said table, each of said plates having a lateral bevel edge projection adjacent one end thereof, a saw positioned to score the rods adjacent said projection, means for effecting relative movement of said rods and said saw, and means for breaking the rods after engagement thereof with said saw, said saw being positioned in a plane between said projection and said breaking means.

5. In a rod cutting machine, a carrier table, a plurality of rod guides on said table, a plurality of clamps for holding said rods on said table, a bracket, a saw rotatably journaled on said bracket and positioned to score said rods, means for rotating said saw, means for causing relative movement of said rods and said bracket in a direction transverse to the axes of said saw and said rods, a finger mounted on said bracket and movable therewith to engage said rods, said finger having an edge spaced from the periphery of said saw for limiting the depth of the score made by the saw, and means for varying the spaced relation between said edge and said periphery.

6. In combination with a rotary cutting disc for scoring glass rods and the like, means for supporting a glass rod, a support for said disc, means for advancing said support toward the rod to bring the disc into scoring engagement with the rod, a guard member slidable relative to said disc and having a score limiting edge portion, means for slidably mounting said guard member on said support and for positioning said limiting edge in proximity to and spaced radially inward from the periphery of said disc, and means for varying said space between said limiting edge portion and said periphery.

7. In combination with a rotary cutting disc for scoring glass rods and the like, means for supporting a glass rod, a support for said disc, means for advancing said support toward the rod to bring the disc into scoring engagement with the rod, a guard member slidable relative to said disc and having an arcuate edge portion, means for slidably mounting said guard member on said support and for positioning said arcuate edge in proximity to said disc, said positioning means maintaining said guard member radially inward from and in spaced substantially concentric relation to the periphery of said disc, and means for selectively varying the spaced relation between said limiting edge portion and said periphery.

ROBERT H. HOUCK.
JOSEPH F. GREENE.
OSWALD BEHREND.